United States Patent [19]
Yamada

[11] Patent Number: 5,289,296
[45] Date of Patent: Feb. 22, 1994

[54] COLOR IMAGE PROCESSING APPARATUS AND METHOD

[75] Inventor: Masanori Yamada, Kawasaki, Japan

[73] Assignee: Canon Kabushiki Kaisha, Tokyo, Japan

[21] Appl. No.: 738,563

[22] Filed: Jul. 31, 1991

[30] Foreign Application Priority Data

Aug. 2, 1990 [JP] Japan .................. 2-206138

[51] Int. Cl.⁵ .................. H04N 1/46
[52] U.S. Cl. .................. 358/530; 358/464; 358/467; 358/537; 358/538
[58] Field of Search .................. 358/75, 76, 79, 80, 358/81, 400, 401, 406, 443, 447, 448, 452, 453, 462, 464, 467, 468, 471, 474, 498

[56] References Cited

U.S. PATENT DOCUMENTS

| | | | |
|---|---|---|---|
| 4,476,486 | 10/1984 | Ayata et al. | 358/75 |
| 4,622,594 | 11/1986 | Honjo et al. | 358/498 |
| 4,739,397 | 4/1988 | Hayaski | 358/80 |
| 4,878,181 | 10/1989 | MacKenna | 395/131 |
| 4,953,012 | 8/1990 | Abe | 358/75 |
| 5,028,991 | 7/1991 | Sekizawa et al. | 358/75 |
| 5,208,903 | 5/1993 | Curry | 395/131 |

*Primary Examiner*—Edward L. Coles, Sr.
*Assistant Examiner*—Jerome Grant II
*Attorney, Agent, or Firm*—Fitzpatrick, Cella, Harper & Scinto

[57] ABSTRACT

A color image processing apparatus in which the background color of an original image to be read is determined by reading the color of a designated position on the original image, by selecting data on one of a plurality of colors previously stored in memory, or by automatically performing background color detection while reading the original image. When outputting the read original image, any of the individual read pixels of the original image coincident with the background color is output as a white pixel.

44 Claims, 17 Drawing Sheets

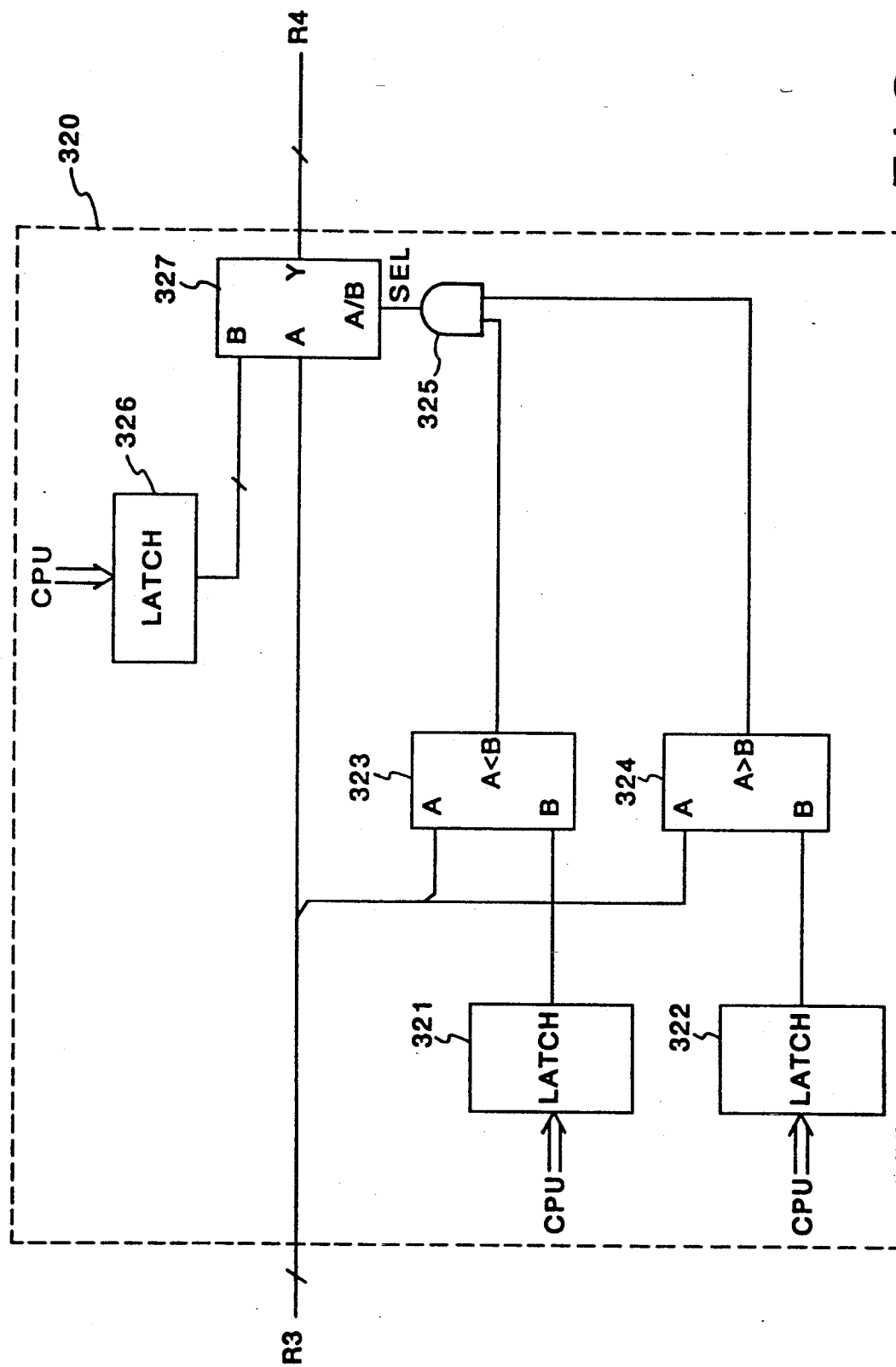
F I G. 4

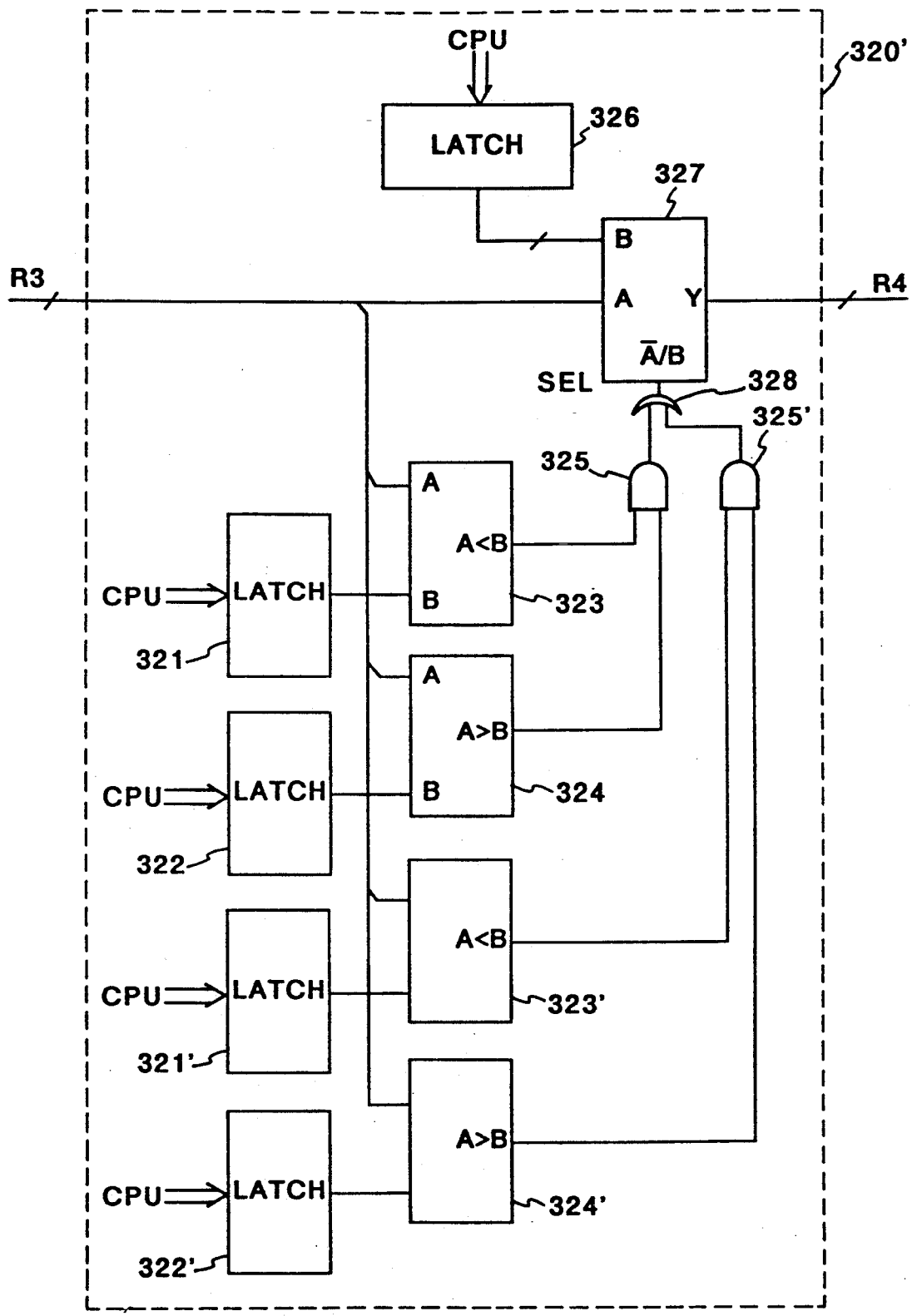
F I G. 10B

COLOR IMAGE PROCESSING APPARATUS AND METHOD

BACKGROUND OF THE INVENTION

This invention relates to a color image processing apparatus and, in particular, to a color image processing apparatus, such as a copying machine, which reads an original image and performs a predetermined processing.

A conventional copying machine is capable of automatically making a judgment as to whether an original it reads is a monochromatic or a color one. The judgment can be made by examining the R, G and B components of the individual pixel data constituting the read image data.

When the read original is a monochromatic one, copying is performed in black only, and, in the case of a color original, copying is performed in the three colors of yellow, magenta, and cyan, or in four colors consisting of the above three and black. Generally, when coping a color original with a copying machine that does not have a one page image memory and that uses only a single photosensitive drum, the number of scannings performed on the read original must correspond to the number of recording colors so that signals corresponding to the respective recording colors (yellow, magenta, cyan, and black) can be generated. In the case of a monochromatic original, however, copying is performed with a single scanning, thus attaining a reduction in copying time as well as a reduction in cost by not using recording materials of needless colors (ink, toner, etc.).

However, the above conventional apparatus has the following problem:

Since the above judgment presupposes an original having a white background, an original having a uniformly colored background will be judged to be a color original even when those portions thereof which constitutes the information, i.e., characters, figures, etc., are black. Thus, with this conventional image processing apparatus, an original which has been prepared by copying an image monochromatically on colored paper or yellowish recycle paper, will be treated as a color original, and is, color-copied when monochromatic copying is enough, resulting in a waste of copying time and cost.

SUMMARY OF THE INVENTION

This invention has been made in view of the above problem. It is accordingly an object of this invention to provide a color image processing apparatus which can obtain signals exclusively representing the image information of an original image, irrespective of the background color thereof.

To achieve the above object, this invention provides a color image processing apparatus comprising: a detection means for detecting the background color of an original image; and a judgment means for determining whether the original is a monochromatic or a color one on the basis of the detection results obtained by the detection means.

Another object of this invention is to provide a color image processing apparatus which can output signals exclusively representing the image information of an original image, irrespective of the background color thereof.

To achieve the above object, this invention provides an image processing apparatus of the type which processes input color component data and supplies it to a predetermined output apparatus, comprising: a detection means for detecting the background color of an original; and a conversion means adapted to convert input color component data to white data when it substantially coincides with the background color data detected by the detection means.

Still another object of this invention is to provide a color image processing apparatus which is capable of copying an original image efficiently, irrespective of the background color thereof.

To achieve the above object, this invention provides an image processing apparatus of the type which performs image copying processing exclusively in black component in the case of a monochromatic original image and which performs image copying processing in a plurality of color components in the case of an original image of a plurality of colors, comprising: a reading means for reading original images; a detection means for detecting the background color of an original image to be read; and a conversion means for converting color component data on a given pixel read by the reading means to white data when it substantially coincides with the background color data detected by the detection means, a copied image being produced by using the data converted by the converting means.

A further object of this invention is to make it possible to perform background detection with ease.

A still further object of this invention is to provide a color image processing apparatus having a high level of operability.

A still further object of this invention is to make it possible to perform background detection with precision.

A still further object of this invention is to provide a copying machine suitable for high speed copying.

A still further object of this invention is to make it possible to realize image reproduction with a high level of image quality.

The level and other objects, features and advantages of the present invention will be apparent from the following description of embodiments of the invention with reference to the accompanying drawings.

BRIEF DESCRIPTION OF THE DRAWINGS

FIG. 4 is a block diagram of a background color checking circuit in FIG. 3A;

FIG. 10B is a block diagram of a background color checking circuit in the second embodiment of the invention;

DESCRIPTION OF THE PREFERRED EMBODIMENTS

In the following, specific embodiments of the color image processing apparatus of this invention will be described with reference to the accompanying drawings.

In the following description, abbreviated characters will be used as follows: M (magenta), C (cyan), Y (yellow), Bk (black), R (red), G (green), B (blue), 4C (four full colors), and 3C (three full colors).

First Embodiment

Figure 2:
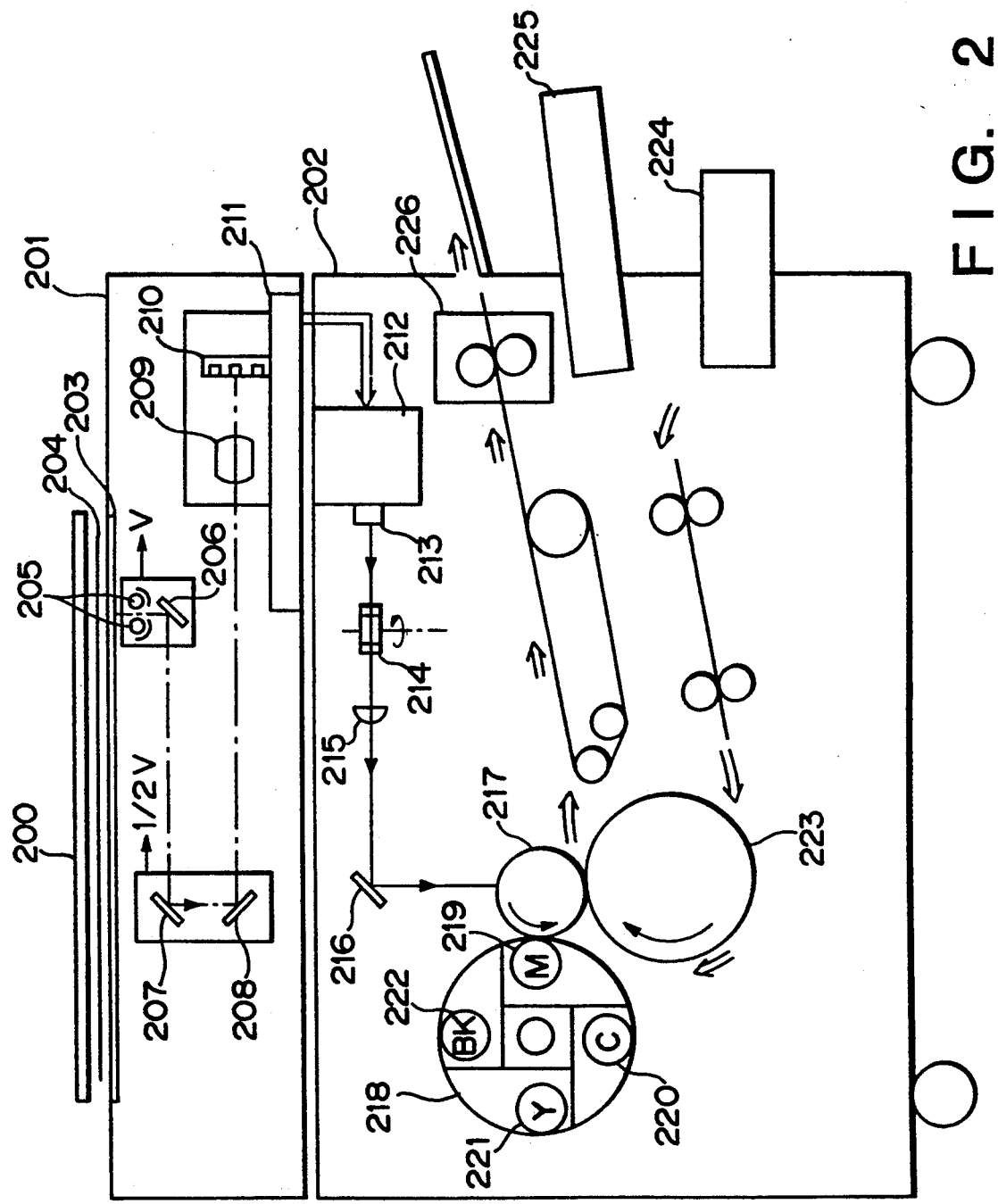
FIG. 2 is a sectional view of a color copying machine in accordance with an embodiment of the invention.

FIG. 2 shows the general construction of an electrophotography-type digital full color copying machine in accordance with an embodiment of this invention.

As shown in the drawing, the copying machine of this embodiment comprises an image scanner section 201 which reads an original and performs digital image signal processing and a printer section 202 which performs, on recording paper, full-color printing of an image corresponding to the original image read by the image scanner section 201. Both the image scanner section 201 and the printer section 202 perform reading or printing with a resolution of 400 dpi.

An original 204 is placed on a glass (hereinafter referred to as the "platen") 203 with its face to be read down and fixed in position by the pressure of an original pressure board 200. Afterwards, the original 204 is illuminated by lamps 205, and the reflected light therefrom is transmitted by way of mirrors 206, 207 and 208 and a lens 209 to a three-line sensor (CCD) 210, where it forms an image. On the basis of the input image, this three-line sensor 210 transmits full color information, color component signals of red (R), green (G), and blue (B), to an image signal processing section 211. The CCD has 5000 pixels for each color. The lamps 205 and the mirrors 206, 207 and 208 move mechanically in a direction perpendicular to the electrical-scanning direction of the line sensor, the lamps 205 and the mirror 206 at a speed of V and the mirrors 207 and 208 at a speed of ½V, thereby scanning the entire surface of the original. The image signal processing section 211 processes the read image signal electrically, decomposing it into the components of magenta (M), cyan (C), yellow (Y), and black (Bk). For one original scanning performed in the printer section 201, one of the component signals M, C, Y, and Bk is supplied to the printer section 202. The image scanner section performs original scanning four times in total. On each scanning, the output component signal is changed, causing the printer section 202 to perform one full color printing.

The M, C, Y, and Bk image signals, supplied face-sequentially from the image scanner section 201, are transmitted to a laser driver 212, which modulates and drives a semiconductor laser 213 in accordance with the image signals. The generated laser beam is transmitted by way of a polygon mirror 214, an f-θ lens 215, and a mirror 216, to scan the surface of a photosensitive drum 217.

The reference numeral 218 indicates a rotary-type developing device, which is composed of a magenta developing section 219, a cyan developing section 220, a yellow developing section 221, and a black developing section 222. These four developing sections are successively brought into contact with the photosensitive drum 217, developing, by means of toner, an electrostatic latent image formed on the photosensitive drum 217.

The reference numeral 223 indicates a transfer drum, around which recording paper fed from a paper cassette 224 or 225 is wound electrostatically, and the image developed on the photosensitive drum 217 is transferred to the recording paper.

In this way, toner images in M, C, Y and Bk are successively transferred to recording paper wound around the transfer drum 223. Afterwards, the leading edge of the recording paper is separated from the transfer drum by means of a separation claw (not shown), and the recording paper is fed toward a fixing unit 226, the paper being eventually discharged to the exterior.

A color copying machine to which the present invention is applied will be described with reference to the block diagram of FIG. 1.

The color copying machine includes a CCD reading section 101, which is equipped with color sensors capable of individually obtaining analog color signals of R (red), G (green), and B (blue), amplifiers for effecting signal amplification for each color, and an A/D converter for converting the color signals to 8-bit digital signals.

The signals are subjected to shading correction, which is performed for each color in a shading correction section 102, and any inter-color or inter-pixel misregistration in the signals is eliminated in a shift memory section 103. Then, the signals are transmitted to a color judgment section 112 to be described below and a LOG conversion section 104, where logarithmic correction for photographic density conversion is performed.

Density signals Y (yellow), M (magenta), and C (cyan), which constitute the output of the LOG conversion section 104, are supplied to a black generation section 105, where a black signal Bk is generated, for example, from Min (Y,M,C).

Further, in a masking/UCR section 106, the signals Y, M, C, and Bk, transmitted from the black generation section 105, are corrected for any filter characteristic, toner density characteristic, etc. of the color sensors. Afterwards, one signal corresponding to the color to be developed is selected from the four color signals and supplied to a density conversion section 107.

The density conversion section 107 converts the density of the input color data in accordance with the development characteristics of the printer, the preference of the operator, etc. Then, a trimming processing section 108 performs edit processing on a desired section of the signal and transmits it to the printer section 202.

A synchronization signal generating section 109 generates a horizontal synchronization signal HSYNC, a pixel synchronization signal CLK, etc. to be used in the image scanner section, on the basis of a horizontal-synchronization-signal BD (beam detect), vertical-synchronization-signal ITOP (image top), etc. which are supplied from the printer section and which are in synchronism with the printing of each line, and transmits the signals thus generated to the various processing sections, the CPU 113, etc.

An original position detecting section 110 detects the position, size, etc. of the original on the basis of the green (G) signal which has undergone shading correction. Further, a scale-changing/movement processing section 111 effects image scale changing, image movement, etc. by controlling the period, timing, etc. of the writing and reading of data to and from the shift memory.

The CPU section 113 has, apart from a microprocessor, a well-known I/0 circuit, a timer circuit, an interrupt control circuit, a serial communication circuit, ROM, RAM, etc., and controls the various processing sections described above. Further, the CPU section 113 controls a pulse motor 114 serving as the driving means for the movement of the optical components (the lamps 205, the mirror 206, etc.), the original illuminating lamps 205, a sensor 116 for detecting the positions of the optical components, an operating section 117, and a digitizer 118 for coordinate designation.

Figure 1:
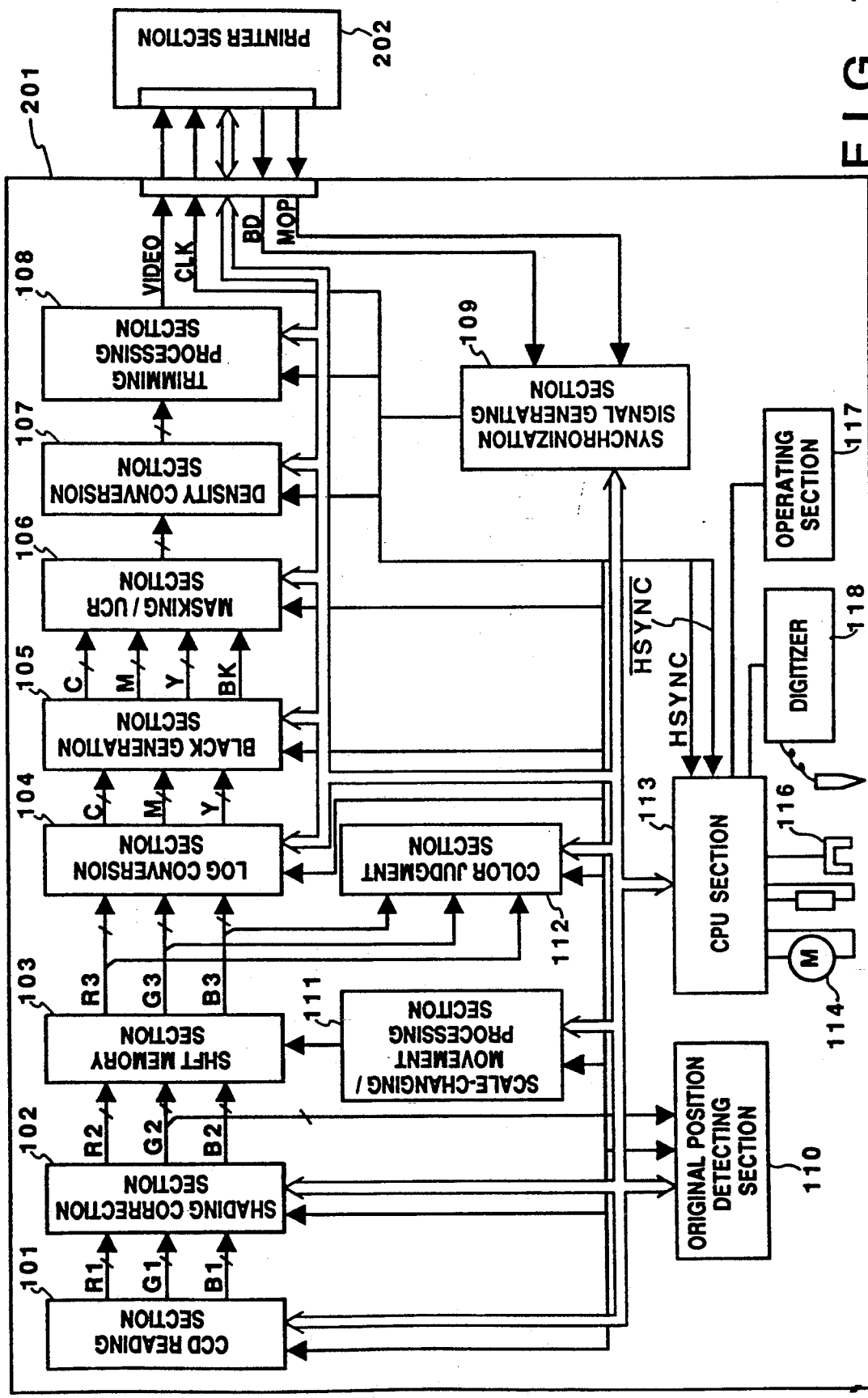
FIG. 1 is a block diagram of an image processing circuit in an embodiment of the invention.
Figure 3A:
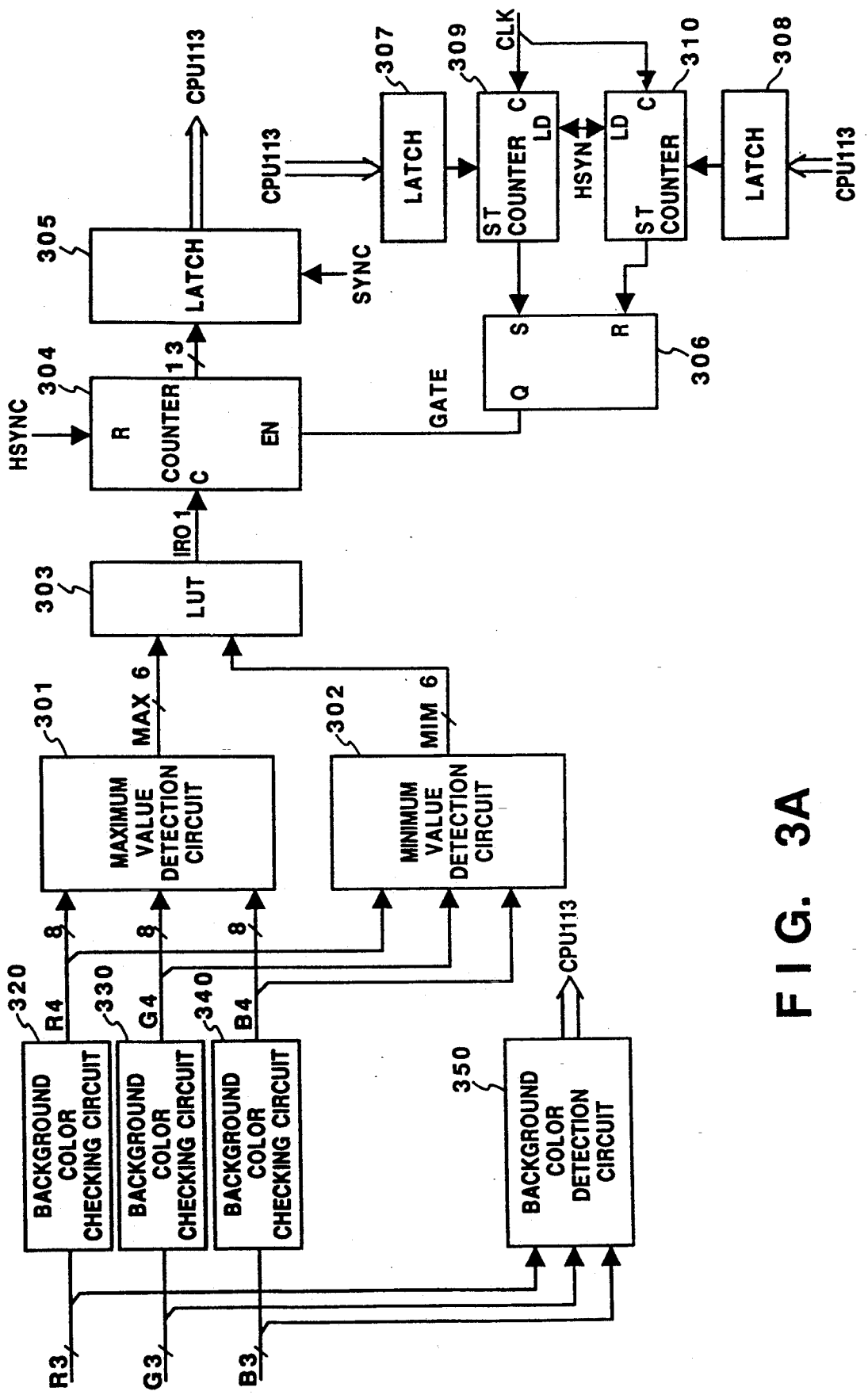
FIG. 3A is a block diagram of a color judgment circuit in an embodiment of the invention.

FIG. 3A shows the construction of a color judgment section (indicated by the reference numeral 112 in FIG. 1).

The color judgment section 112 has two functions: one is to detect the background color of an original (the inherent color thereof), and the other is to make a judgment as to whether the image on the original is a chromatic or an achromatic image.

The signal components R3, G3 and B3 with respect to a given pixel, read from the shift memory section 103, are respectively supplied to background checking circuits 320, 330 and 340. At the same time, they are supplied to a background detection circuit 350.

The background detection circuit 350 detects image data on a predetermined position as background color data (as will be described below in detail).

The background checking circuits 320, 330 and 340 check whether an image signal corresponds to the background color or not, on the basis of the background color data obtained by the above-mentioned background detection circuit. If the signal corresponds to the background color, they convert it such that it will not serve as data for color judgment. The background checking circuits will be described below with reference to FIG. 4.

Signals Re, G4 and B4, constituting the output of the background checking circuits 320, 330 and 340, are supplied to a maximum value detection circuit 301 and a minimum value detection circuit 302, which respectively output MAX=max(R4, G4, B4) and MIN=min(R4, G4, B4). In this embodiment, 6-bit outputs MAX and MIN (The lower two bits are omitted) are obtained with respect to the 8-bit inputs of R, G, and B.

Then, the outputs MAX and MIN are supplied to a look-up table LUT 303 as addresses, whereby a 1-bit color judgment signal IRO is obtained.

Figure 3B:
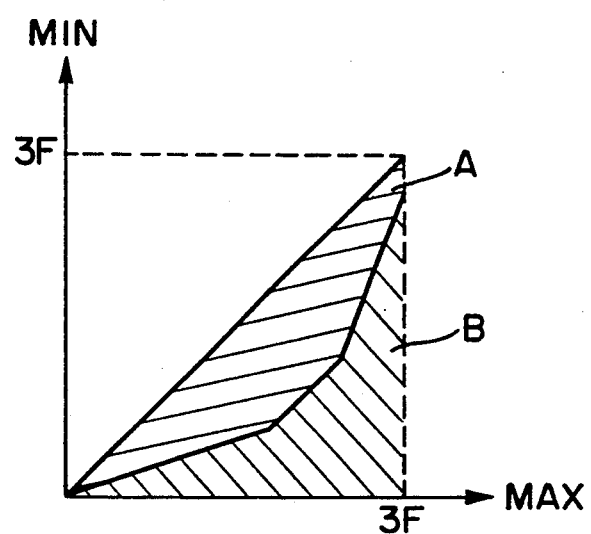
FIG. 3B is a diagram showing the relationship between chromatic and achromatic colors in an embodiment of the invention.

FIG. 3B shows the contents of the LUT 303. In the two-dimensional space formed by the input MAX and MIN, region A is judged to be achromatic, with "0" being output, and region B is judged to be chromatic, with "1" being output. The judgment signal IRO thus obtained is supplied to a counter 304 as a clock.

The counter 304 is reset by the horizontal synchronization signal HSYNC, and counts the number of pixels judged to be chromatic of the judgment signal IRO corresponding to that section of one main scanning line which is permitted by a GATE signal, which is the output of a flip-flop 306. This count value is read by a CPU 113 through a latch 305.

The flip-flop 306 is set by a count-up signal of an ST counter (start bit counter) 309 and reset by a count-up signal of an EN counter (end bit counter), generating a count permission signal GATE for the counter 304. The ST counter 309 and the EN counter 310 respectively count down the count values written to latches 307 and 308 by the CPU.

In this way, it is possible to count the number of pixels judged to be chromatic in an arbitrary section of each main scanning line.

FIG. 4 shows the construction of the background color checking circuit of the embodiment. Since the circuits 320, 330 and 340 have the same construction, FIG. 4 only shows the circuit 320, which is for the R signal.

The image signal R3 is supplied to comparators 323 and 324 and a selector 327. In a latch 321, the upper limit value of the R component of the background, Rmax, and, in a latch 322, the lower limit value of the R component of the background, Rmin, as detected by the above-mentioned background detection circuit 350, are previously set by the CPU. Accordingly, when Rmin<R3<Rmax, the outputs of comparators 323 and 324 are both "1", with the output signal SEL of an AND gate 325, which is the logical product thereof, being also "1". When the SEL signal from the AND gate 325 is "0", the selector 327 emits the signal R3 as R4, and, when the SEL signal is "1", it emits the contents of a latch 326, for example, "FF" (HEX), as R4.

Regarding each of the remaining two background checking circuits, 330 (or 340), it likewise outputs a fixed value "FF" (HEX) as G4 (or B4) when Gmin<G3<Gmax (or Bmin<B3<Bmax), otherwise outputs G3 (or B3).

In this embodiment, each item of color component data is represented in 8 bits. Further, when it is said that the luminance data R, G, B is "FF", it implies that the recording paper is all blank, that is, nothing is recorded thereon.

Thus, in the background portion of the original, R4, G4 and B4 are all "FF" (HEX), so that they are judged to be in region A of FIG. 3B mentioned above, i.e., achromatic (white), not contributing, even in the case of a colored background, to the counting of those pixels judged to be chromatic.

A background detection means will be described with reference to FIGS. 5 and 6. In this first embodiment, a portion of the original to be read is designated by the operator, and the portion thus designated is recognized as the background, with color information on that portion being detected.

Figure 5:
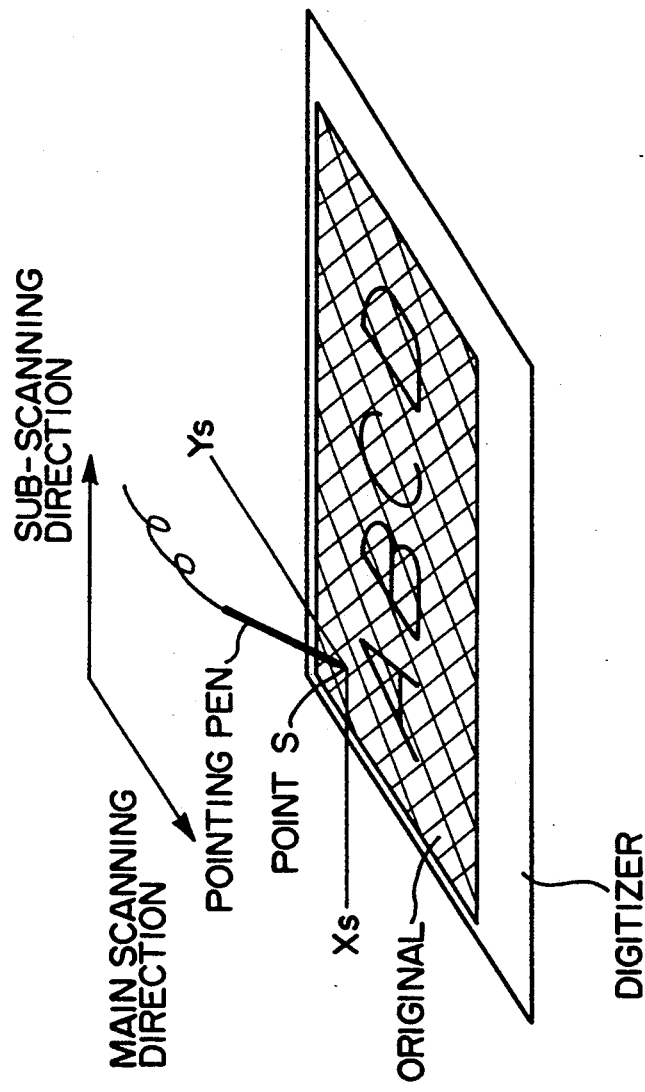
FIG. 5 is a diagram illustrating the original background color designation principle in the first embodiment of the invention.

In the example shown in FIG. 5, an original with a colored background is placed on a digitizer and a point S in the background portion of the original is designated with a pointing pen. Through this operation performed by the operator, the apparatus obtains the coordinates (Xs, Ys) of the point S. Here, Xs is a value in pixel unit, and Ys a value in line unit, with one unit being 1/400 inches in both of them.

Figure 6:
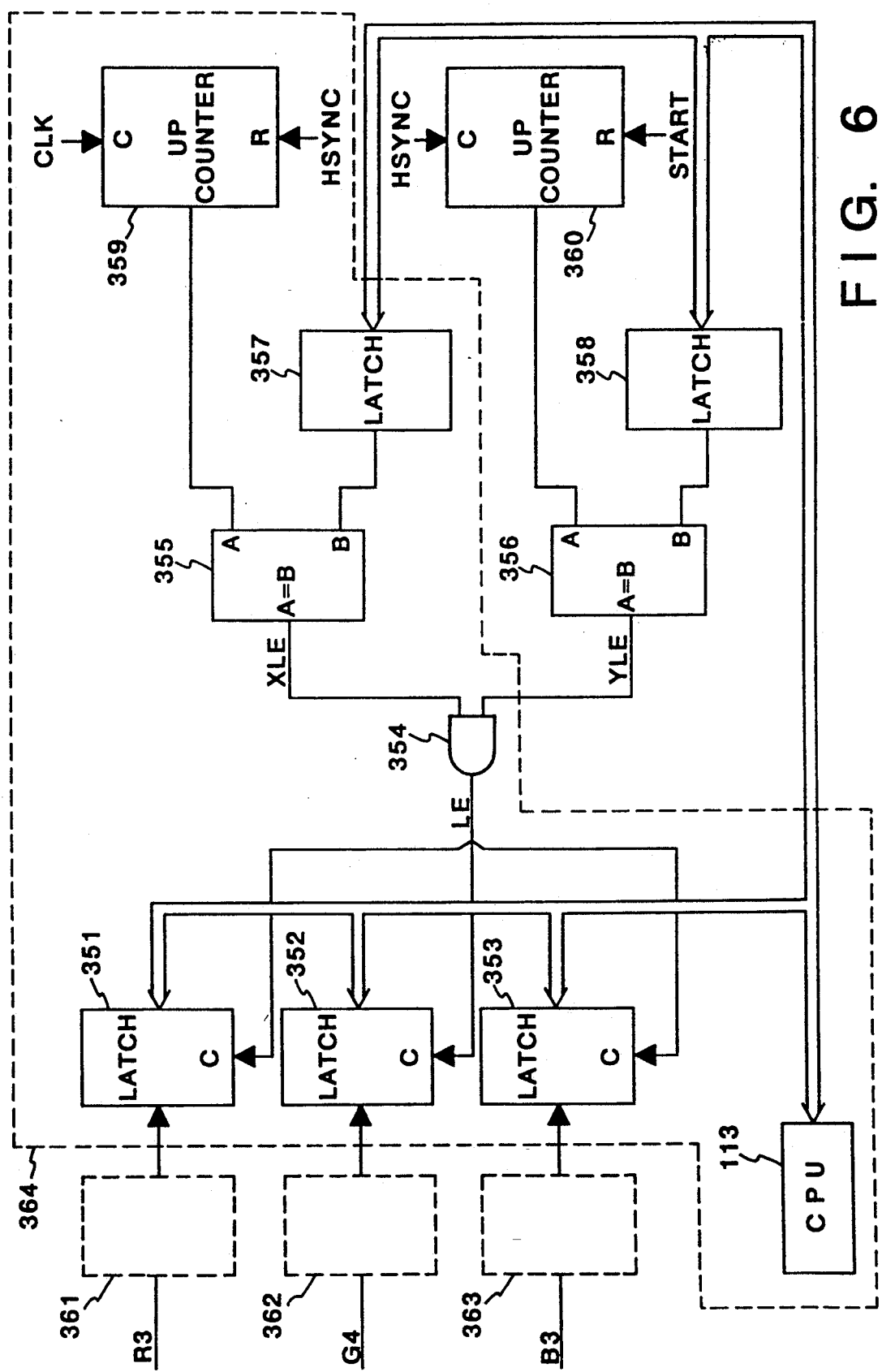
FIG. 6 is a block diagram of the background color detection circuit in FIG. 3A.

FIG. 6 shows the background detection circuit 350. An UP counter 359 is a main scanning counter using a pixel clock CLK as clock, starting counting in synchronism with the horizontal synchronization signal HSYNC. An UP counter 360 is a sub-scanning counter using the horizontal synchronization signal HSYNC as clock, starting counting in response to a START signal emitted by the CPU 113 at the sub-scanning start edge of the original.

The counting output values of these two counters are respectively compared, at comparators 355 and 356, with the contents of latches 357 an 358. When the counting output values coincide with the latch contents, the comparator output XLE or YLE is "1". Further, the CPU previously sets the above-mentioned "Xs" and "Ys", indicative of the the background color detecting position designated by the digitizer 118, at the latches 357 and 358. When both XLE and YLE are "1", the output of an AND gate 354, LE, is "1". This output signal LE is used as the signal for causing the image signals R3, G3 and B3 at the detecting position to be latched by latches 351, 352 and 353, respectively. After the scanning of the original has been completed, the CPU detects the color of the portion designated by the operator as the background, Ro, Go and Bo, from the results of the latching at these three latches.

From margin values Rm, Gm and Bm, determined previously and empirically, Rmax=Ro+Rm, Rmin=Ro−Rm, Gmax=Go+Gm, Gmin=Go−Gm, Bmax=Bo+Bm, and Bmin=Bo−Bm, are calculated, causing them to be latched by the latches 321 and 322 shown in FIG. 4.

A more stable background color detection can be effected by providing well-known smoothing circuits 361, 362 and 363 on the input side of the latches 351, 352 and 353, respectively, in FIG. 6.

Figure 7A:
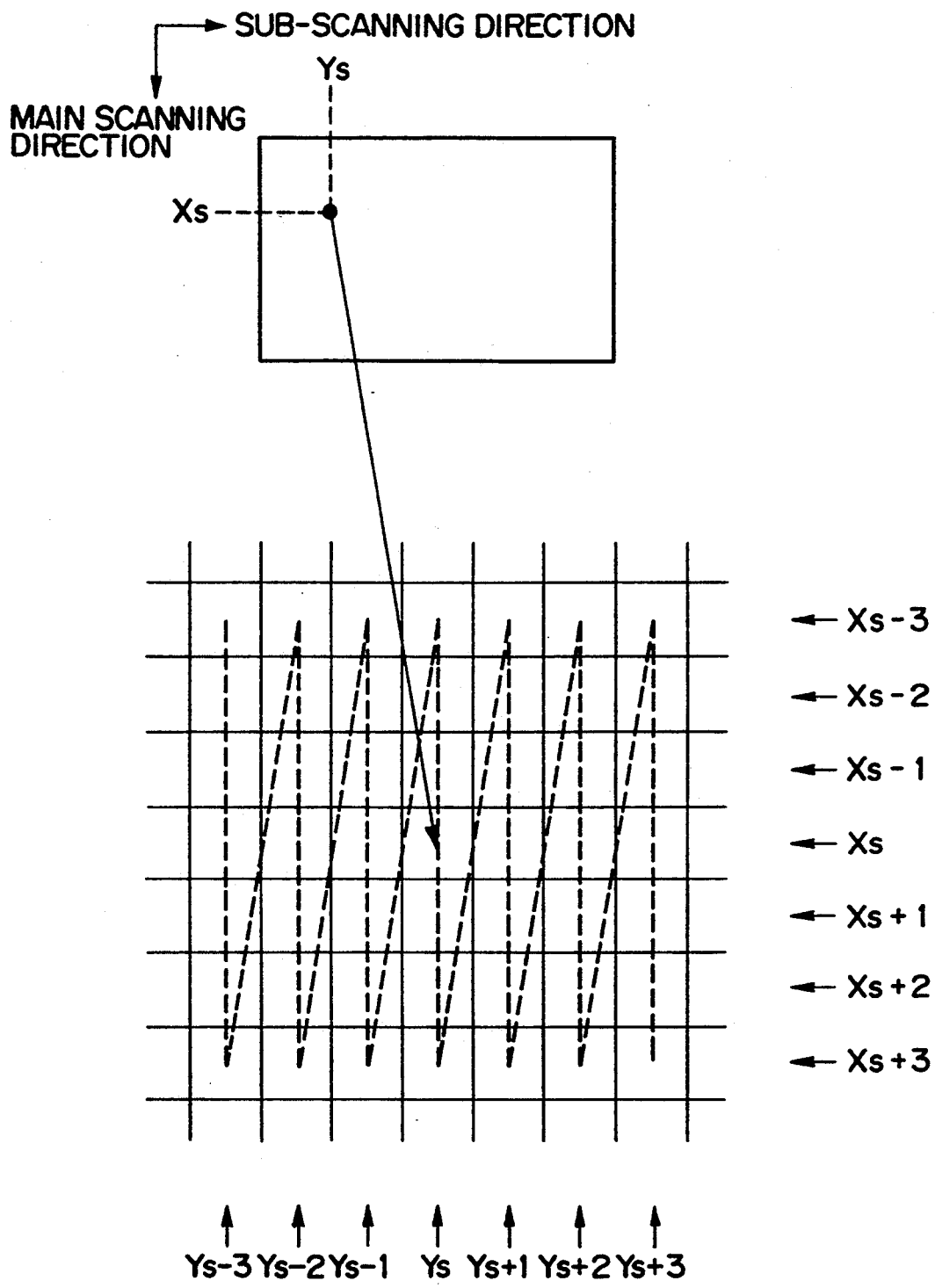
FIG. 7A is a diagram showing a reference area for background color detection.

Further, a more economical detection circuit can be formed by using only the circuit portion 364, eliminating the circuits 356, 358 and 360 related to the sub-scanning counter and the smoothing circuits 361, 362 and 363 in FIG. 6. In that case, the CPU can sample an arbitrary pixel in each main scanning line by means of the main scanning counter after moving the optical system, which is driven by a stepping motor 114, to an arbitrary sub-scanning position. Then, as shown in FIG. 7A, the CPU calculates for each color a weighted average value with an appropriate significance level, for example, of 7×7=49 pixels around the pixel (Xs, Ys) concerned, thereby obtaining the background colors Ro, Go, Bo.

Thus, when making a judgment as to whether the original is a monochromatic or a color one, the color of the background portion of the original is removed from the object of judgment, thereby preventing unnecessary color copying from being executed. That is, by providing a means for detecting and judging the background color of the original along with the uniformity thereof, it is possible to automatically select an appropriate development color, recording paper, density, tone, etc.

Figure 7B:
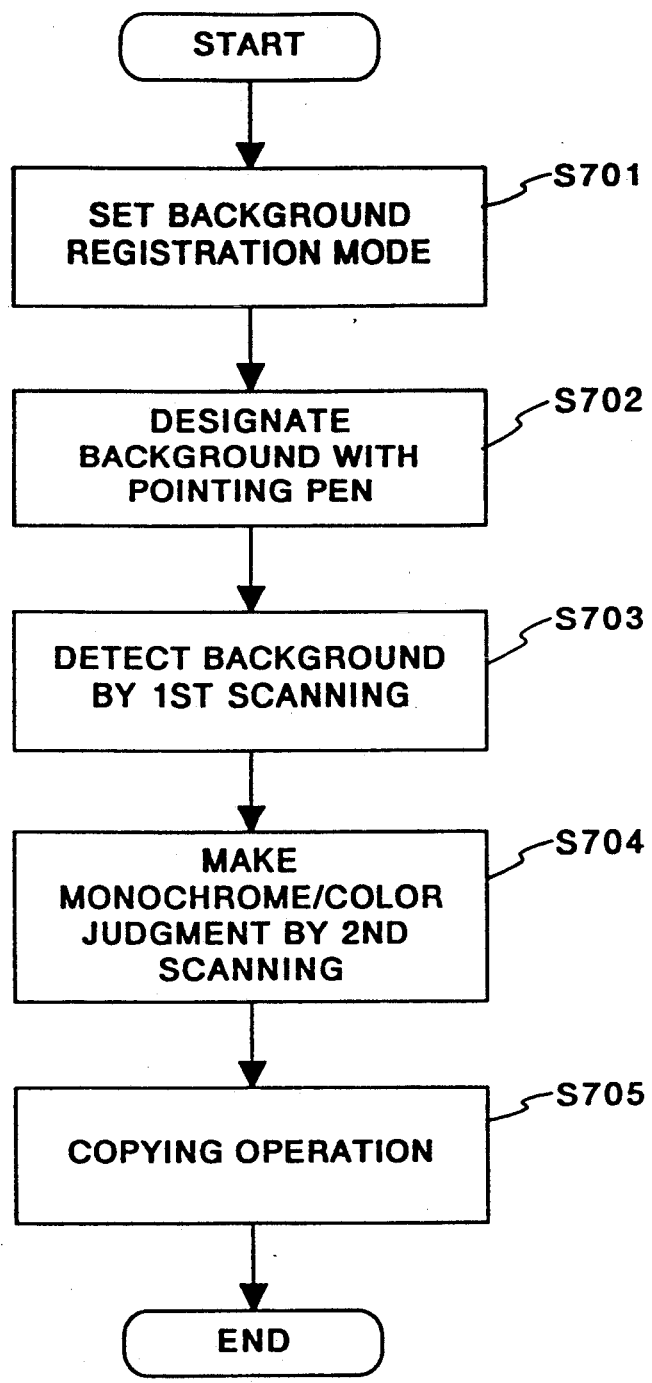
FIG. 7B is a flowchart illustrating the processing operation in the first embodiment of the invention.

The flowchart of FIG. 7B shows the procedure of this embodiment.

First, in Step S701, the operator sets the background registration mode by depressing the mode setting key in the operating section 117. Then in Step S702, the operator designates a position of the color to be registered as the background color by using the digitizer 118 and the pointing pen. After the designation, the procedure moves on to Step S703, where the color of the designated position is detected as the background color through a first scanning by the optical section. Subsequently, in Step S704, a second scanning is performed by the optical section, making monochromatic/color judgment on the original, taking into account the background color. In Step S705, monochromatic or color copying operation is selected in accordance with the judgment result, and the selected copying operation is performed.

While in the above-described example scanning is performed twice for the background color detection and monochromatic/color judgment, it is possible to perform both the background color detection and the monochromatic/color judgment with a single scanning if all the scanning data is stored in memory.

Further, it is also possible to effect the above processing operations substantially in a single reciprocation cycle if the first scanning is performed by the forward movement of the reader and the second scanning by the backward movement of the same.

Second Embodiment

In the first embodiment described above, a portion of the background color of the original is designated by the operator. This arrangement is certainly effective in a case where various background colors are involved. However, when the background color is fixed, as in the case where the original invariably consists of a copying output on a certain fixed type of colored paper or recycle paper, the above-described designation process, which takes a considerable length of time, is not desirable in terms of operability. In view of this, a second embodiment of the present invention adopts an arrangement in which data on the background color of a certain kind of paper which is frequently used for copying, such as recycle paper, can be designated with ease, thus attaining an improvement in operability.

Figure 8A:
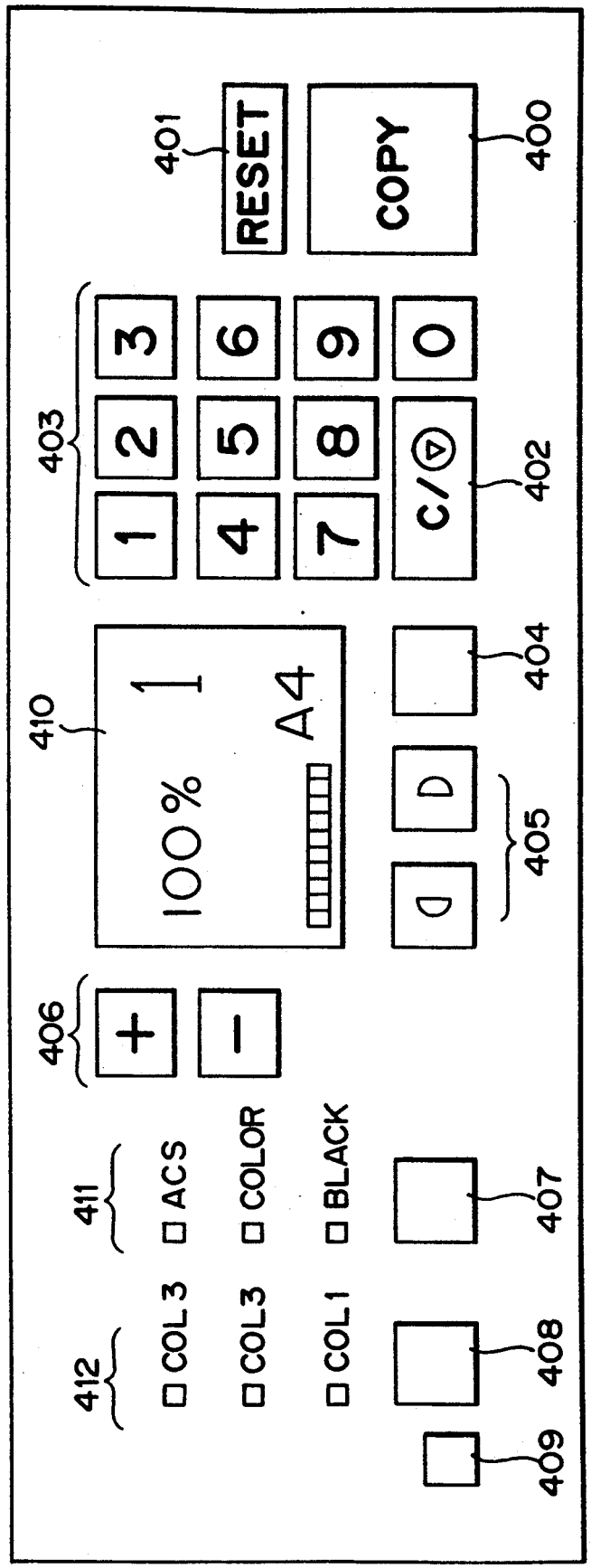
FIGS. 8A and 8B are diagrams showing the operating sections of color copying machines in accordance with embodiments of the invention.

FIG. 8A shows the operating section of an apparatus in accordance with the second embodiment. This operating section includes a copy start key 400, a reset key 401 for restoring the copying mode to the normal one, a clear/stop key 402 for restoring number of copies to 1, stopping copying operation, etc., a ten-key group 403 for inputting number of copies and other items of data, a cassette key 404 for selecting copying paper, a density key 405 for adjusting copying density, a scale key 406 for setting copying scale, and a display section 410 for displaying set items such as number of copies, scale, paper size, and density, and the apparatus condition, etc., a color mode key 407 for selecting the color mode, and a display section 411 for displaying the result of selection made through the color mode key. The display section 411 has three modes: a black monochromatic copying mode in which copying is performed in black only irrespective of the type of original; a color copy mode in which full-color copying is performed in the four colors of M, Y, C and K irrespective of the type of original, and an ACS copying mode. Here, "ACS" is an abbreviation of "auto color selection". In this ACS copying mode, a judgment is made as to whether an original is a monochromatic or a color one, automatically selecting and executing black monochromatic copying or color copying in accordance with the judgment result. The reference numeral 408 indicates a key for selecting background color, and the reference numeral 412 indicates a display section for displaying the selection result. Here, the background color can be selected from among three different colors. The reference numeral 409 indicates a key for registering these three background colors.

When the apparatus is to execute copying in the ACS copying mode, the operator depresses the key 407 to select the ACS mode, and, at the same time, depresses the key 408 to select the background color of the original. Afterwards, the operator depresses the copying start key 400. For example, the symbol "COL1" may be allotted to ordinary originals with a white background, "COL2" to originals with a yellowish background, and "COL3" to originals with a pink background, which are often used, for example, in offices with a view to attracting attention. In the ACS copying mode, those colors which should be removed from the object of color judgment are designated previously.

Figure 9A:
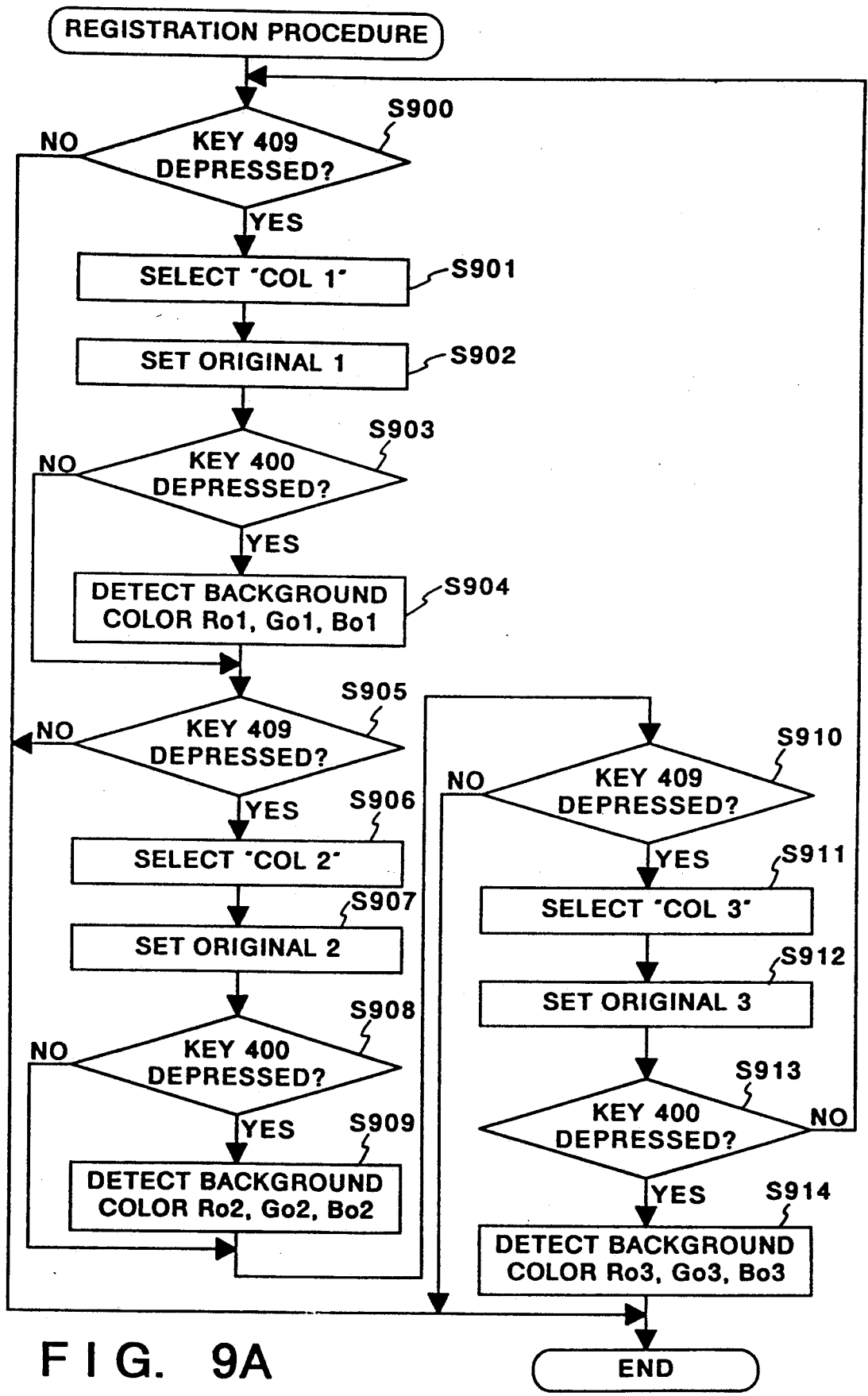
FIG. 9A is a flowchart illustrating a background color registering operation.

A background color registering procedure will be described with reference to the flowchart of FIG. 9A. The background color data (R, G, B) to be registered with respect to "COL1" is stored in address areas Ro1, Go1 and Bo1 of non-volatile RAM (not shown) provided in the CPU section 113. Likewise, the data RGB to be registered with respect to "COL2" is stored in address areas Ro2, Go2 and Bo2, and the data with respect to "COL3" is stored in address areas Ro3, Go3 and Bo3.

First, the operator depresses the key 409 (Step S900) to select "COL1" (901). Then, a sheet of paper having a background color corresponding to the color to be registered as "COL1", for example, a white copying paper, is placed on the original tray as "original 1" (Step S902). Afterwards, the key 400 is depressed (Step S903), upon which the optical section scans the "original 1" to detect the background color data, storing it in the area Ro1, Go1 and Bo1 of the non-volatile RAM (Step S904).

Then, the operator depresses the key 409 again (Step S905) to select "COL2" (S906). A sheet of paper having a background color corresponding to the color to be registered as "COL2" is set as "original 2" (Step S907), and, by depressing the key 400 (Step S908), the background color data is detected and stored in the address areas Ro2, Go2, and Bo2 of the non-volatile RAM (Step S909)

Likewise, color data on, for example, pink paper is detected and stored as "COL3" in the address areas Ro3, Go3, and Bo3 of the non-volatile RAM.

Figure 9B:
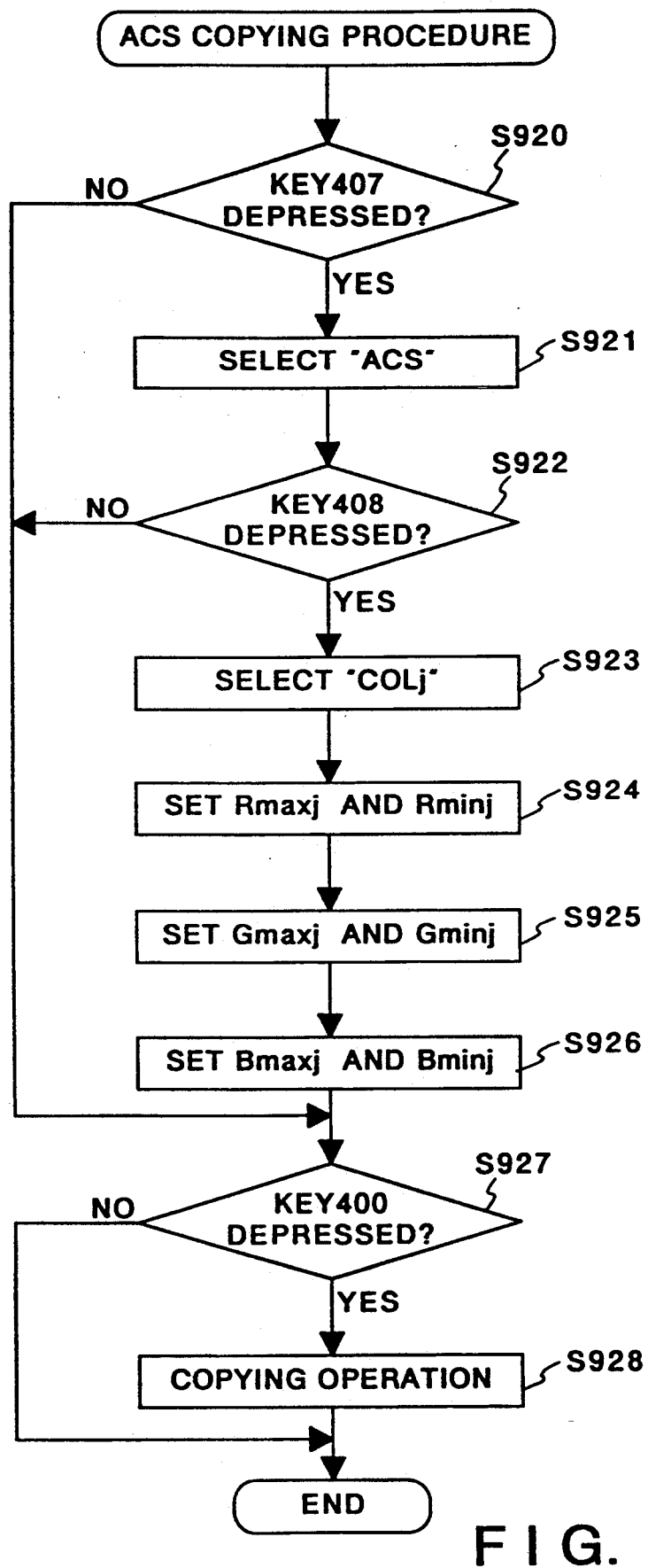
FIG. 9B is a flowchart illustrating a background color selecting operation.

Next, the ACS copying procedure will be described with reference to the flowchart of FIG. 9B.

First, a judgment is made as to whether the key 407 has been depressed or not (Step S920); when the depression of the key is detected, the apparatus is in the "ACS" mode. Then, when it is determined that the key 408 has been depressed (Step S922), "COLj" (j=1,2 or 3) is selected as the background color in accordance with the operation performed (Step S923).

Afterwards, the procedure moves on to Steps S924 and S925, where the following operations are executed: In accordance with the selected "COLj", RGB data is read out from the address areas Roj, Goj and Boj of the non-volatile RAM in which data has been registered and stored. Then, as described above, the comparison values to be set in the background checking circuits 320, 330 and 340, i.e., Rmax, Rmin, Gmax, Gmin, Bmax and Bmin, are calculated and set.

When the setting of the colors which should be recognized as background color has been completed, a judgment is made as to whether the key 400 has been depressed or not (Step S927), and copying operation is performed (Step S928).

By thus preparing keys corresponding to original background colors previously registered, a substantial improvement can be attained in terms of operability.

The present invention is particularly effective in copying a plurality of originals by using an automatic original feeding device (hereinafter referred to as "ADF"). When copying a plurality of originals of various types, as shown in FIG. 10A, all the originals except for original C would be color-copied in the prior art, whereas, in the ACS copying according to the present invention, originals A, C and E, which need not be color-copied, are accurately copied in black only, the operator having only to select, prior to the copying start, the background colors to be found in the group of originals.

Figure 10A:
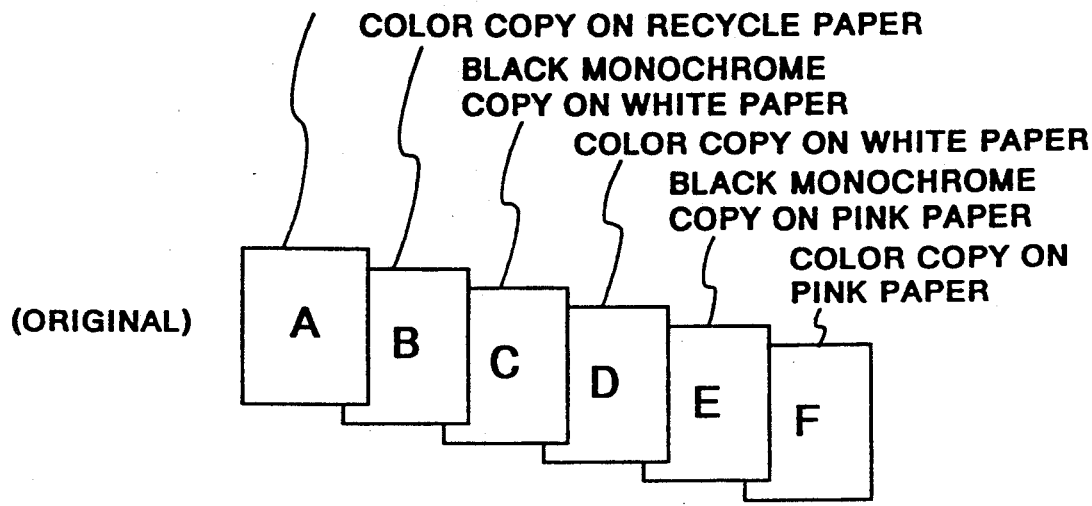
FIG. 10A is a diagram showing copying results obtained by the present invention as compared with those in the prior art.
Figure 10A:
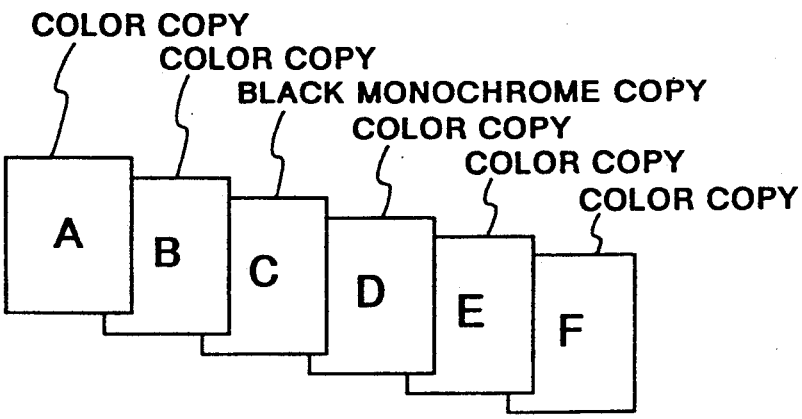
Figure 10A:
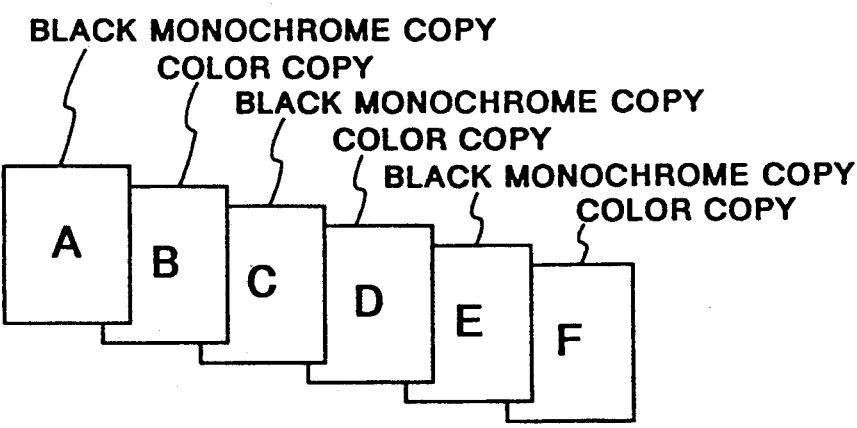

When performing ACS processing by using an ADF, the background checking circuit 320 of FIG. 4 is modified to a circuit 320' as shown in FIG. 10B. The circuit of FIG. 10B differs from that of FIG. 4 in that latches 321' and 322', comparators 323' and 324', and an AND circuit 325' are added so that the number of background colors to be checked may be augmented by one, with the outputs of the AND circuits 325 and 325' being subject to mutual operation at the OR circuit 328. In the case of FIG. 10A, the FF value set at the latch 326 is output when at least either the recycle-paper color or pink is detected.

Further, it is also possible to previously register, by using the background color selection key 408 in the operating section, which of the originals set in the ADF has the background color requiring the cancelling of color copying.

It goes without saying that the background colors to be registered are not restricted to recycle-paper color and pink, with the number of colors registered not being restricted to the above, either.

Further, it may be so arranged that selection can be made between the conventional ACS shown in FIG. 10A and that of the present invention described above.

Figure 8B:
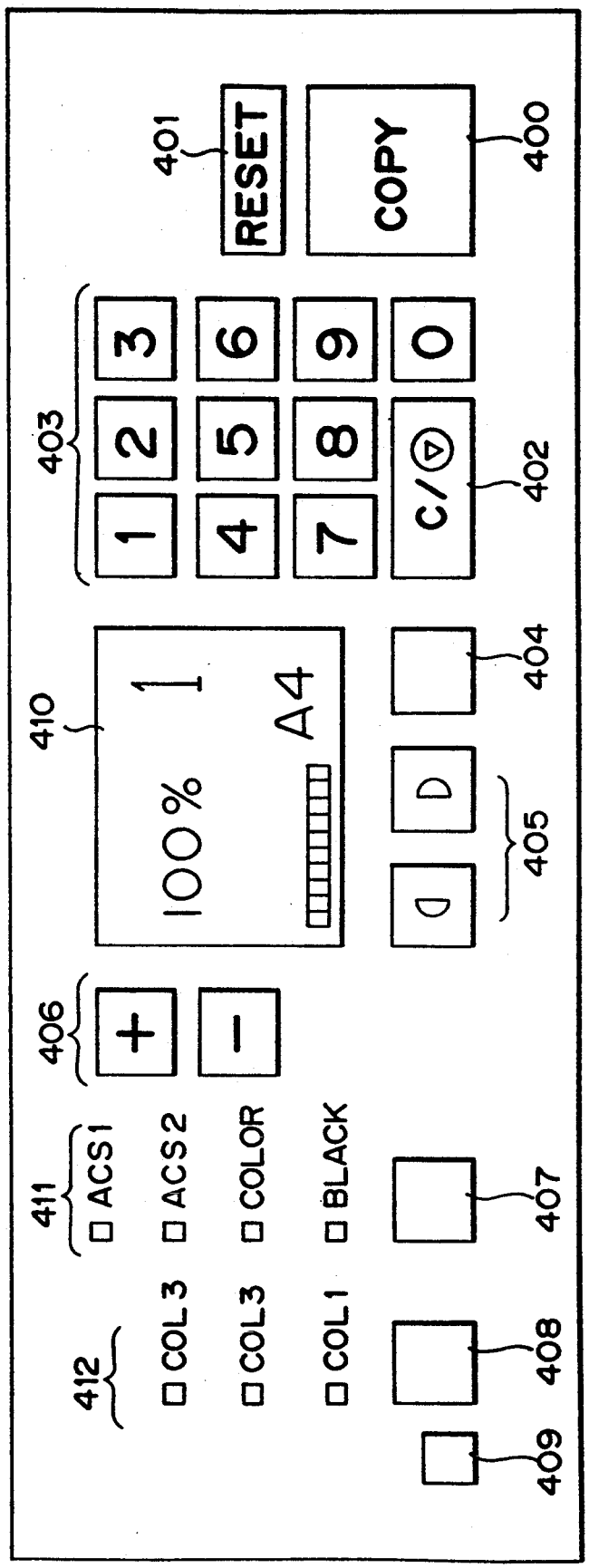

That is, as shown in FIG. 8B, selection may be made, by means of the color mode key 407 for color mode selection, between an ACS1 mode in which ACS processing is performed without taking into account the background color, an ACS2 mode in which ACS processing is executed taking the background color into account, and a black monochromatic copying mode in which copying is effected in black only. The selection result is displayed on the display section 411.

This arrangement is effective in a case where the operator does not necessarily desire an ACS processing in which the background color is taken into account. If, for example, the pink background of an original image printed in black only on pink paper, is to be reproduced, it is expedient to select the ACS1 mode.

In the case where ACS1 is set, the CPU 113 forcibly sets the background color RGB to "FF (white)", whereby a background color other than white is judged to be "color", thus preventing the execution of a processing in which the background color is ignored.

Third Embodiment

While in the first and second embodiments described above those colors which should not be judged as "color" are previously designated by the operator, a third embodiment of this invention adopts an arrangement in which background color detection is performed automatically.

Figure 11:
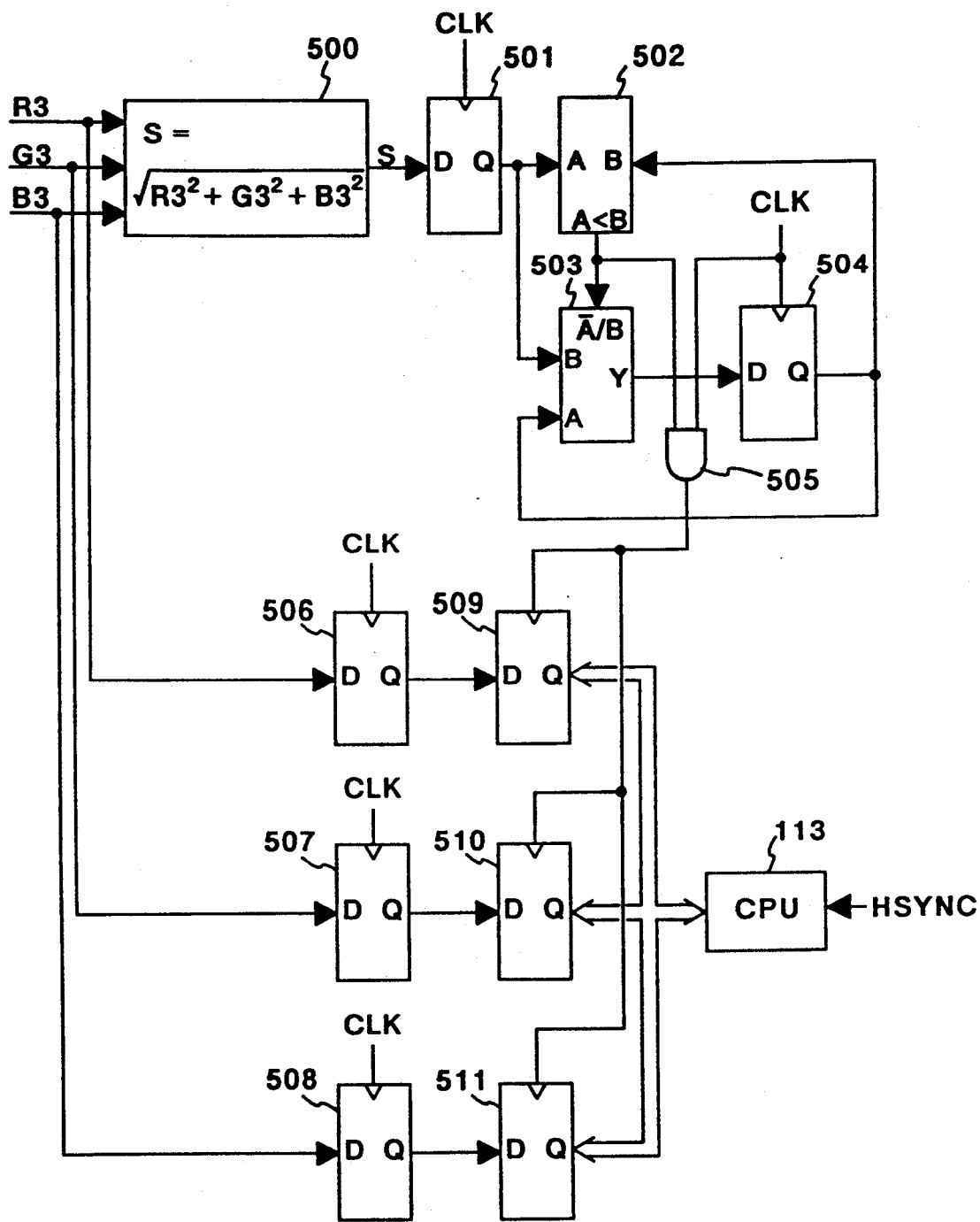
FIG. 11 is a block diagram of the background color detection circuit in the third embodiment of the invention.

In the following, the background detection circuit 350 of the third embodiment, the construction of which is shown in FIG. 11, will be described.

The three image signals R3, G3, and B3 are supplied to an arithmetic unit 500, which calculates, for example, the distance of the position (R3, G3, B3) of the RGB in a three-dimensional space from the origin, the distance S, as a norm value for background judgment, supplying it to a latch 501. The brighter the original, the greater is the value of the norm S. The norm S can be arbitrarily defined; thus, it may, for example, be defined as: $S = \alpha R3 + \beta R3 + \gamma B3$ ($\alpha$, $\beta$ and $\gamma$ are appropriate coefficients).

The output of the latch 501 is transmitted to a comparator 502, where it is compared with the output of a latch 504, which output corresponds to the norm S one or more clock prior thereto. When the output of the latch 501 is larger, an output signal "1" is transmitted to a selector 503. As a result, a new norm S is transmitted to the latch 504. Further, the output of the comparator 502 is synchronized at a gate 505 with the image clock and then supplied as a clock to latches 509, 510 and 511. The above operations are continued for a period corresponding to one main scanning line, whereby RGB color components giving the maximum value of the norm S during that period, (Rs, Gs, Bs) are stored in the latches 509, 510 and 511.

Figure 12:
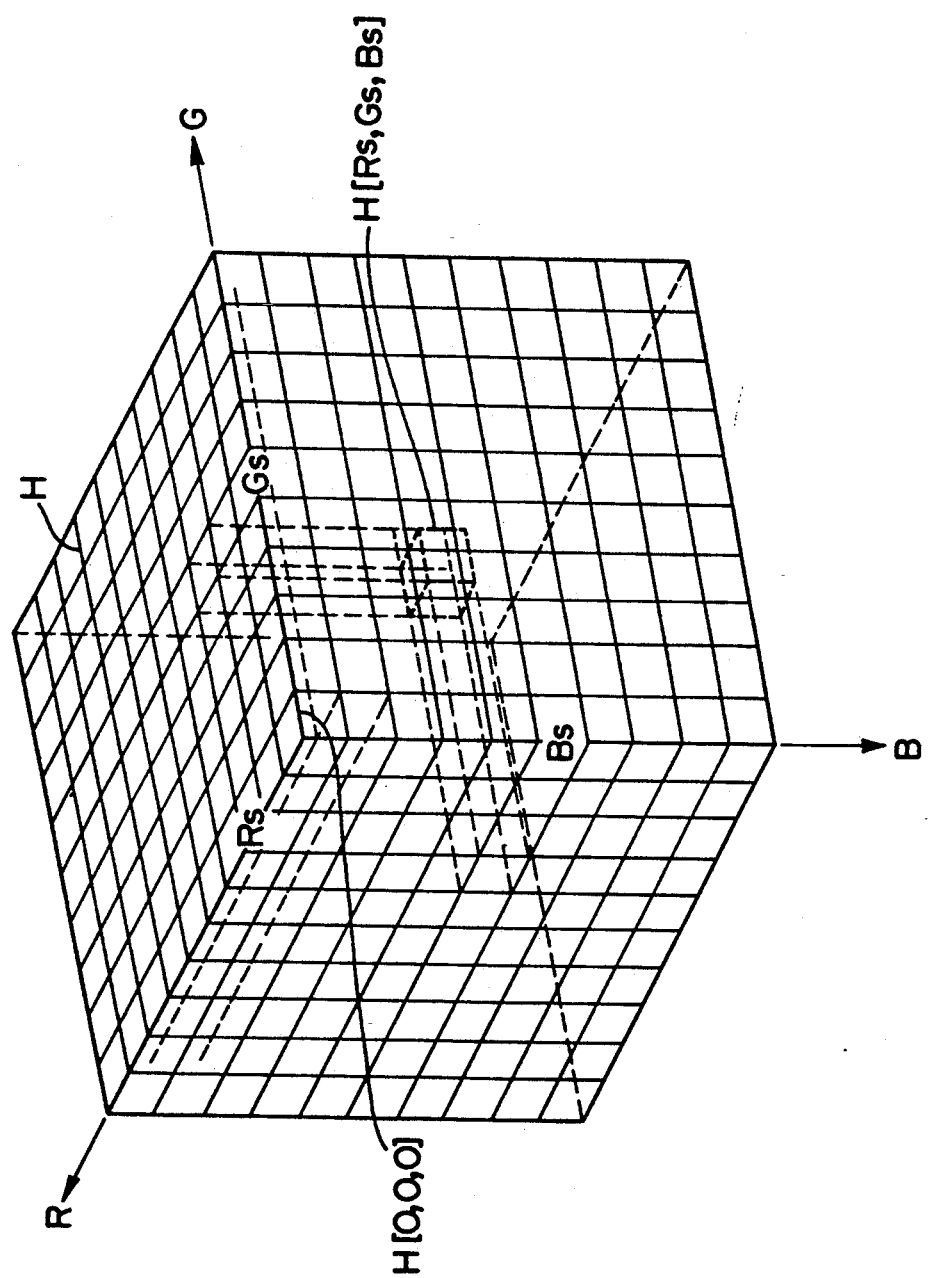
FIG. 12 is a diagram illustrating the background color detection principle in the third embodiment of the invention.

The CPU 113 reads the content of these latches in synchronism with the horizontal synchronization signal HSYNC, incrementing the contents H[Rs, Gs, Bs] of the address (Rs, Gs, Bs) of a three-dimensional table H formed on the RAM, as shown schematically in FIG. 12. When the above operation has been completed for the entire sub-scanning area, a histogram indicative of the frequency of a background color is produced.

Thus, the (Ri, Gj, Bk) indicative of max H[Ri, Gi, Bk] ($0 \leq i,j,k \leq 255$) is kept as background color data (Ro, Go, Bo) as described with reference to the first and second embodiments, making it possible to remove it from the object of monochromatic/color judgment.

It is possible to make the bit number of Rs, Gs, Bs small so as to keep the capacity of the table H at an appropriate level.

To explain it more plainly, the above operation is based on the principle that the color of the background is brighter than any of the colors used in depicting a figure, an image, etc. thereon. In other words, depicting a figure or an image means putting other colors on the background, which are never brighter than the background color. To utilize this fact, the brightest color is detected for each line. The detection is effected several times in the sub-scanning direction (In this embodiment, this corresponds to the total number of sub-scanning operations performed), the brightest of the colors thus detected being regarded as the background color.

Thus, even when background color designation has not previously been performed by the operator, background color detection can be automatically effected, thus making it possible to perform an optimum ACS copying irrespective of the number of controllable background colors.

The results of color judgment made on each pixel may be utilized as follows; For example, the original may be judged to be monochromatic only when all the pixels constituting it are achromatic, or, alternatively, it may be judged to be so even when the pixels include less than a certain predetermined number (a certain predetermined proportion) of chromatic ones. Further, for high-speed processing, it is possible to perform sub-sampling (thinning out), making chromatic/achromatic judgment, for example, on every four pixels.

Further, the printer is not restricted to a laser beam printer as described above. Any type of printer will serve the purpose as long as it is capable of color output. Thus, it may also be an ink jet printer, thermal printer, dot printer, etc. Further, regarding the input means, it is not restricted to a reader for reading an original. It may also be a host computer, still video camera, video camera, etc.

Further, by providing a transmission/reception apparatus on the input side of the printer, the present invention can be applied to a facsimile apparatus. That is, when transmitting by facsimile, for example, a black image formed on blue paper, the data regarding the color blue is removed from the transmitted data. Thus, the facsimile apparatus on the reception side does not perform the unnecessary operation of reproducing the blue background on white recording paper. Further, the type of apparatus constituting the object of output is not restricted to a printer and a facsimile apparatus. It may also be an external memory apparatus. That is, it is possible to read images from such external memory apparatus later on and print them out.

As described above, the present invention makes it possible to obtain exclusively signals representing the image information of an original image, irrespective of the background color thereof.

Further, the present invention makes it possible to output exclusively signals representing the image information of an original image, irrespective of the background color thereof.

Moreover, the present invention makes it possible to perform the copying of an original image efficiently, irrespective of the background color of the original.

For example, an original consisting of a photocopy made on colored paper or recycle paper is copied monochromatically, and there is no risk of such an original being unnecessarily color-copied. Further, by providing a means of registering background colors, in the form of keys or the like, an improvement can be attained in terms of operability. Further, by providing a means of automatically detecting background colors, more types of originals can be dealt with.

While in the above embodiments color component data on each color component is output as "FF (hexadecimal number)" when the read pixel data substantially coincides with the background color, it may be so arranged that this value can be changed, whereby an output image having a desired background color can be obtained.

Further, while in the above-described embodiments the background color is taken into account when making monochromatic/color judgment on an original and, when reproducing the original, the background color image data is converted to white to ignore the background color, it is also possible to take the background color into account only when making monochromatic/color judgement, and to perform the processing where the background color is ignored not by image data conversion but by controlling the processing conditions.

For example, the CPU 113 may control the exposure of the laser driver 212 in the printer section 202, the development bias in the developing sections 219 through 222, the potential of the photosensitive drum, etc. In such cases, the background can be ignored as in the ordinary AE.

It should be understood that the foregoing relates to only preferred embodiments of the invention, and that it is intended to cover all changes and modifications of the examples of the invention herein chosen for the purpose of disclosure, which do not constitute departures from the spirit and scope of the invention.

What is claimed is:

1. A color image processing apparatus, comprising:
   input means for inputting color component data representing an original image;
   detection means for detecting a background color of the original image;
   judgment means for judging whether a portion of the original image other than an area having the background color is a monochromatic image or a multicolor image; and
   process means for processing the color component data in accordance with the judgment result of said judgment means.

2. A color image processing apparatus according to claim 1, wherein said detection means includes:
   position designation means for designating a position in the background portion of the original; and
   color detection means for detecting color data on the designated position of the original image as the background color.

3. A color image processing apparatus according to claim 2, wherein said color detection means performs background color detection on the basis of color component data on a plurality of pixels in an area around the position on the original image designated by said position designation means, including the pixel of that position.

4. A color image processing apparatus according to claim 1, wherein said detection means includes:
   memory means for storing data on a plurality of colors; and
   selection means for selecting the data on one of the plurality of colors stored in said memory means as the background color.

5. A color image processing apparatus according to claim 4, further comprising registration means for registering background color data in said memory means.

6. A color image processing apparatus according to claim 1, further comprising reading means for reading an original image, and wherein said detection means comprises:
   calculation means for calculating a value indicative of degree of brightness on the basis of color component data, R, G, B, on pixels read by said reading means;
   first extraction means for extracting data on pixel having the maximum level of brightness of each of predetermined divisional areas of an original image; and
   second extraction means for extracting data on pixel of the maximum frequency among the pixels extracted by said first extraction means;
   the color component data R, G, B on the pixel extracted by said second extraction means being detected as the background color.

7. A color image processing apparatus according to claim 1, further comprising conversion means, which converts color component data R, G, B on a given pixel to data representing white when the color component data satisfies the following inequalities with respect to background color data Ro, Go, Bo:

$$Ro-Rm<R<Ro+Rm$$

$$Go-Gm<G<Go+Gm$$

$$Bo-Bm<B<Bo+Bm$$

(where Rm, Gm and Bm are fixed positive values).

8. The color image apparatus according to claim 1, wherein said monochromatic image is a black image.

9. A color image processing apparatus which processes input color component data and supplies it to a predetermined output apparatus, comprising:
   input means for inputting color component data representing an original image;
   detection means for detecting a background color of the original image;
   conversion means for converting the color component data representing substantially the same color as the background color detected by said detection means into white data without converting the color component data representing other colors, and
   output means for outputting the color component data converted by said conversion means.

10. A color image processing apparatus according to claim 9, wherein said output apparatus consists of a printer.

11. A color image processing apparatus according to claim 9, wherein said output apparatus consists of a facsimile apparatus connected to a telephone circuit.

12. A color image processing apparatus according to claim 9, wherein said detection means includes:
    position designation means for designating a point in the background portion of the original image; and
    color detection means for detecting color data on the designated position of the original image as the background color.

13. A color image processing apparatus according to claim 12, wherein said color detection means performs background color detection on the basis of color component data on a plurality of pixels in an area around the position designated by said position designation means, including the pixel of the designated position.

14. A color image processing apparatus according to claim 9, wherein said detection means includes:
    memory means for storing data on a plurality of colors; and
    selection means which selects data on one of the colors stored in said memory means as the background color.

15. A color image processing apparatus according to claim 14, further comprising registration means for registering background color data in said memory means.

16. A color image processing apparatus according to claim 14, further comprising reading means for reading an original image and an original feeding means for feeding a plurality of original images successively to said reading means.

17. A color image processing apparatus according to claim 9, further comprising reading means for reading an original image, and wherein said detection means includes:
    calculation means for calculating a value indicative of degree of brightness on the basis of color component data, R, G, B, on the pixels read by said reading means;

first extraction means for extracting data on the pixel having the maximum level of brightness of each of predetermined divisional areas of an original image; and second extraction means for extracting data on the pixel of the maximum frequency among the pixels extracted by said first extraction means;

the color component data R, G, B on the pixel extracted by said second extraction means being detected as the background color.

18. A color image processing apparatus according to claim 17; further comprising reading means for reading an original image and an original feeding means for feeding a plurality of original images successively to said reading means.

19. A color image processing apparatus according to claim 9, wherein said conversion means converts color component data R, G, B on a given pixel to data representing white when the color component data satisfies the following inequalities with respect to background color data Ro, Go, Bo:

$$Ro-Rm<R<Ro+Rm$$

$$Go-Gm<G<Go+Gm$$

$$Bo-Bm<B<Bo+Bm$$

(where Rm, Gm and Bm are fixed positive values).

20. The color image apparatus according to claim 9, wherein said monochromatic image is a black image.

21. A color image processing apparatus which reproduces a monochromatic original image in black component and which reproduces a multi-colored original image in a plurality of color components, said color image processing apparatus comprising:

reading means for reading an original image and generating color component data;

detection means for detecting a background color of the original image to be read;

conversion means for converting the color component data representing substantially the same color as the background color detected by said detection means into white data without converting the color component data representing other colors; and reproduction means for reproducing an image by using the data converted by said conversion means.

22. A color image processing apparatus according to claim 21, wherein said detection means includes:

position designation means for designating a position in the background portion of the original image; and color detection means for detecting color data on the designated position of the original image as the background color.

23. A color image processing apparatus according to claim 22, wherein said color detection means performs background color detection on the basis of color component data on a plurality of pixels in an area around the position designated by said position designation means, including the pixel of the designated position.

24. A color image processing apparatus according to claim 21, wherein said detection means includes:

memory means for storing data on a plurality of colors; and selection means which selects data on one of the colors stored in said memory means as the background color.

25. A color image processing apparatus according to claim 24, further comprising registration means for registering background color data in said memory means.

26. A color image processing apparatus according to claim 24, further comprising original feeding means for feeding a plurality of original images successively to said reading means, said selection means being biased for each original.

27. A color image processing apparatus according to claim 21, wherein said detection means includes:

calculation means for calculating a value indicative of degree of brightness on the basis of color component data R, G, B on the pixels read by said reading means;

first extraction means for extracting data on the pixel having the maximum level of brightness of each of predetermined divisional areas of an original image; and second extraction means for extracting data on the pixel of the maximum frequency among the pixels extracted by said first extraction means;

the color component data R, G, B on the pixel extracted by said second extraction means being detected as the background color.

28. A color image processing apparatus according to claim 27, further comprising an original feeding means for feeding a plurality of original images successively to said reading means.

29. A color image processing apparatus according to claim 21, wherein said conversion means converts color component data R, G, B on a given pixel to data representing white when the color component data satisfies the following inequalities with respect to background color data Ro, Go, Bo:

$$Ro-Rm<R<Ro+Rm$$

$$Go-Gm<G<Go+Gm$$

$$Bo-Bm<B<Bo+Bm$$

(where Rm, Gm and Bm are fixed positive values).

30. The color image apparatus according to claim 21, wherein said monochromatic image is a black image.

31. A color image processing apparatus comprising:

input means for inputting color component data representing an original image;

detection means for detecting a background color of the original image;

first judgment means for judging whether the original image including an area having the background color is a multi-color image or a monochromatic image;

second judgment means for judging whether a portion of the original image other than an area having the background color is a multi-color image or a monochromatic image;

selection means for selecting between said first and second judgment means; and process means for processing the color component data in accordance with the judgment result of selected one of said first and second judgment means.

32. A color image processing apparatus according to claim 31, further comprising processing means for processing said input image in accordance with the judgement results obtained by said first or second judgment means selected by said selection means.

33. A color image processing apparatus according to claim 31, further comprising reading means which is adapted to scan originals to generate image data, said input image being supplied from said reading means.

34. The color image apparatus according to claim 31, wherein said monochromatic image is a black image.

35. A color image processing apparatus comprising:
input means for inputting color component data representing an original image;
detection means for detecting a background color of the original image;
first judgment means for judging whether the original image including an area having the background color is a multi-color image or a monochromatic image;
second judgment means for judging whether a portion of the original image other than an area having the background color is a multi-color image or a monochromatic image;
first mode setting means for setting a mode in which a judgment is not performed by said first and second judgment means; and
second mode setting means for setting a mode in which a judgment is performed by said second judgment means.

36. A color image processing apparatus according to claim 35, further comprising processing means for processing said input image in accordance with the judgement results obtained in the mode set by said first or second mode setting means.

37. A color image processing apparatus according to claim 35, further comprising reading means which is adapted to scan originals to generate image data, said input image being supplied from said reading means.

38. The color image apparatus according to claim 35, wherein said monochromatic image is a black image.

39. A color image processing method, comprising the steps of:
inputting color component data representing an original image;
detecting a background color of the original image;
judging whether a portion of the original image other than an area having a background color is a monochromatic image or a multi-color image; and
processing the color component data in accordance with the judgment result of said judging step.

40. A color image processing method according to claim 39, wherein said detection step includes:
designating a position in the background portion of the original; and
detecting color data on the designated position of the original image as the background color.

41. A color image processing method according to claim 40, wherein said color detection means performs background color detection on the basis of color component data on a plurality of pixels in an area around the position on the original image designated by said position designation means, including the pixel of that position.

42. A color image processing method according to claim 39, wherein said detection step includes:
storing data on a plurality of colors in a memory means; and
selecting the data on one of the plurality of colors stored in said memory means as the background color.

43. A color image processing method according to claim 42, further comprising registration step for registering background color data in said memory means.

44. The color image apparatus according to claim 39, wherein said monochromatic image is a black image.

* * * * *

UNITED STATES PATENT AND TRADEMARK OFFICE
CERTIFICATE OF CORRECTION

PATENT NO. : 5,289,296
DATED : February 22, 1994
INVENTOR(S) : MASANORI YAMADA

It is certified that error appears in the above-identified patent and that said Letters Patent is hereby corrected as shown below:

COLUMN 1

Line 22, "coping" should read --copying--.

COLUMN 8

Line 32, "cle" should read --cled--.
Line 38, "recycle" should read --recycled--.

COLUMN 10

Line 37, "recycle-paper" should read --recycled-paper--.

COLUMN 12

Line 40, "recycle" should read --recycled--.

COLUMN 14

Line 24, "colors, and" should read --colors; and--.
Line 54, "claim 14;" should read --claim 14,--.

COLUMN 15

Line 9, "means;" should read --means,--.
Line 14, "claim 17;" should read --claim 17,--.

UNITED STATES PATENT AND TRADEMARK OFFICE
CERTIFICATE OF CORRECTION

PATENT NO.    :   5,289,296
DATED         :   February 22, 1994
INVENTOR(S)   :   MASANORI YAMADA It is certified that error appears in the above-identified patent and that said Letters Patent is hereby corrected as shown below:

<u>COLUMN 16</u>

Line 25, "means;" should read --means,--.

Signed and Sealed this

Thirtieth Day of August, 1994

Attest:

BRUCE LEHMAN

*Attesting Officer*          *Commissioner of Patents and Trademarks*